No. 895,325. PATENTED AUG. 4, 1908.
R. R. ALLEN.
MEANS FOR THE DAYLIGHT LOADING AND UNLOADING
OF PHOTOGRAPHIC SENSITIZED PLATES.
APPLICATION FILED SEPT. 6, 1907.
3 SHEETS—SHEET 2.
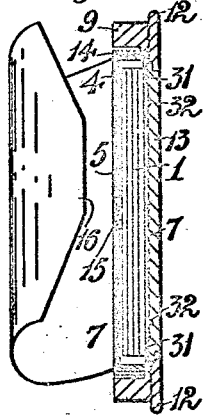
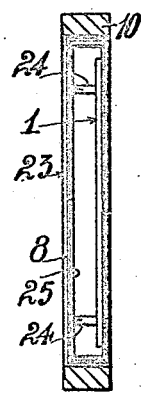
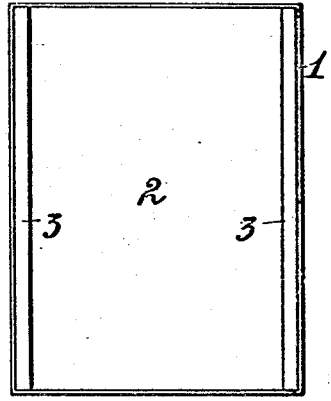
Witnesses
William G. Holder
Percy Johnston
Inventor
Rupert Richard Allen
By Lew Waters & Sons
Attorneys No. 895,325.  
R. R. ALLEN.  
MEANS FOR THE DAYLIGHT LOADING AND UNLOADING OF PHOTOGRAPHIC SENSITIZED PLATES.  
APPLICATION FILED SEPT. 6, 1907.
PATENTED AUG. 4, 1908.
3 SHEETS—SHEET 3.
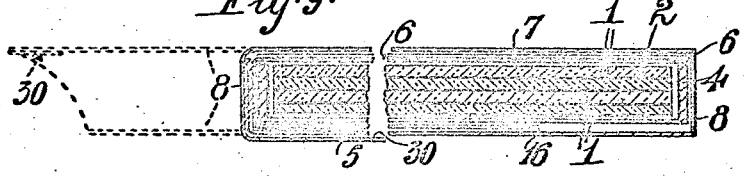
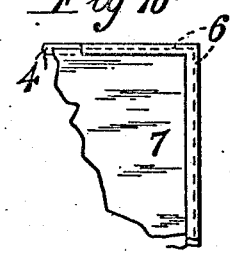
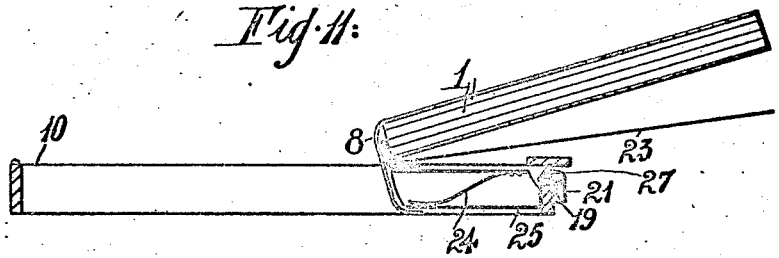
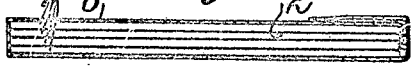
Witnesses  
William G. Holden  
Percy Johnston
Inventor  
By Rupert Richard Allen
Attorneys

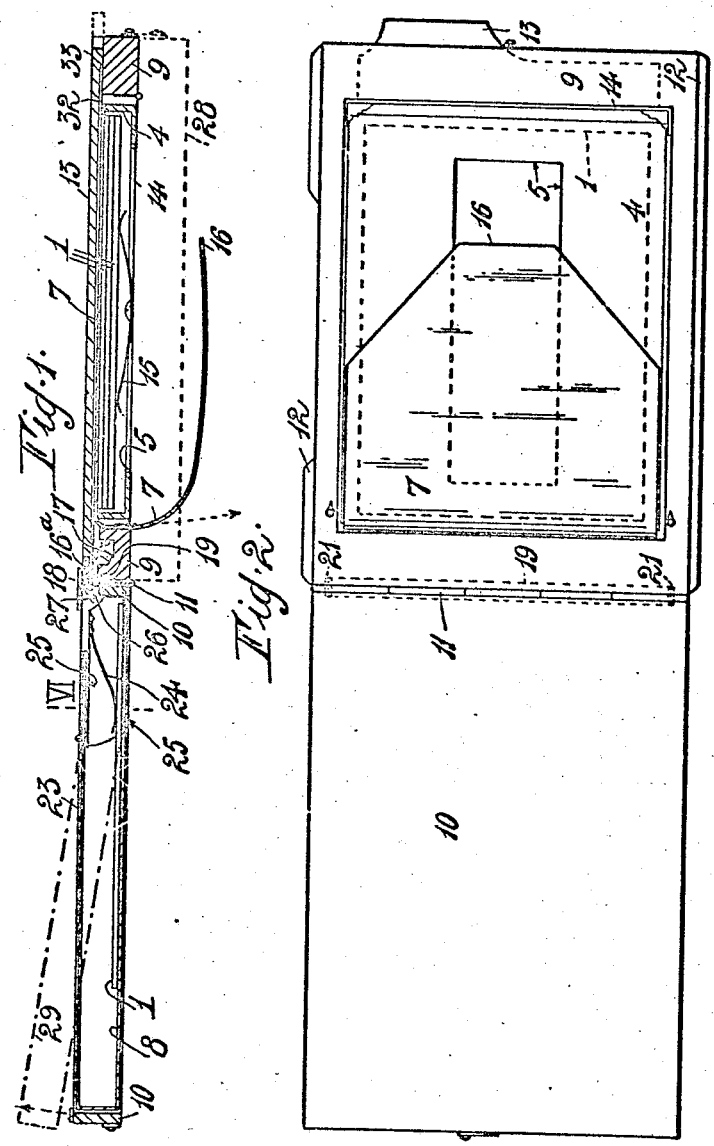

UNITED STATES PATENT OFFICE.

RUPERT RICHARD ALLEN, OF EAST MELBOURNE, VICTORIA, AUSTRALIA.

MEANS FOR THE DAYLIGHT LOADING AND UNLOADING OF PHOTOGRAPHIC SENSITIZED PLATES.

No. 895,325.

Specification of Letters Patent.

Patented Aug. 4, 1908.

Application filed September 6, 1907. Serial No. 391,583.

*To all whom it may concern:*

Be it known that I, RUPERT RICHARD ALLEN, a subject of the King of Great Britain, residing at "Rubra," Hotham street, East Melbourne, in the State of Victoria, Australia, clerk, have invented Means for the Daylight Loading and Unloading of Photographic Sensitized Plates, of which the following is a specification.

This invention has been devised in order to provide a simple and reliable means for loading and unloading sensitized plates for photographic purposes in the daylight and particularly for loading and unloading a number at a time, and operating same sequentially in the camera.

The means employed necessitates the packing of the plates (which have an antihalation or other backing) in a special manner and the use of a novel plate-holder as hereafter referred to.

The invention is illustrated by the accompanying drawings whereof,—

Figure 1 is a longitudinal horizontal section through the plate-holder in its extended position, and Fig. 2 is a rear side elevation thereof. Fig. 3 is an end elevation of the plate-holder when closed. Fig. 4 is a fragmentary sectional view showing a detail of Fig. 3. Fig. 5 is a vertical section through one part of the plate-holder. Fig. 6 is a vertical section on line VI Fig. 1. Fig. 7 is a plan of a plate, and Fig. 8 an enlarged transverse section of a portion thereof. Fig. 9 is an enlarged (broken) horizontal section through a packet of plates. Fig. 10 is an elevation of a portion of the packet. Fig. 11 is a horizontal section showing the mode of removing the exposed plates, and Fig. 12 is a similar view of such plates packed after removal.

According to this invention each plate 1 has an anti-halation or other backing 2 provided with slightly thickened portions or raised strips 3 along two edges of the plate parallel with its line of travel to prevent the sensitized face being scratched or rubbed. This backing may be completely gummed or pasted on the plate or attached either at one or both ends so as to be easily removed when developing.

The plates are packed with their sensitized faces foremost and not face to face as is customary in a specially constructed opaque cartridge 4, and the number of plates and size of the cartridge corresponds with the capacity of the plate-holder.

The cartridge 4 consists of a shallow box of wood, metal, cardboard or other suitable material formed with a longitudinal slot or opening 5 in its back, while upon the front edges of three of its sides are formed undercut guides 6 adapted to receive the side edges and one end of an opaque detachable flexible cover 7 formed on or as an extension of said cartridge, and which passes in front of the sensitized face of the foremost plate and around the outlet end of the cartridge and thence around the back thereof where its end is secured or the whole cartridge held intact by a band or the like. This cartridge is placed in an opaque envelop-shaped wrapper 8 open at one end only and one side of said wrapper is preferably longer than the other and is gummed on its interior edge. The package of plates made up in the manner above described and as shown in Fig. 9 is then in its marketable condition.

The plate-holder is formed in two parts 9, 10, adapted to be suitably connected together either by a hinge 11 or otherwise, and one part 10 is arranged to receive the exposed plates.

The part 9 of the plate-holder is formed with ribs 12, 12, to guide it into the camera and is provided with the usual slide 13 and with a hinged door 14 at the back having a spring 15 on its interior side and arranged to pass through the opening or slot 5 of the cartridge when the door is closed.

In loading the plate-holder its hinged door 14 is first swung open. The cartridge 4 is then carefully removed from its wrapper 8 and placed in said holder with its detachable cover 7, against the slide as shown in Fig. 1. The cartridge is then held in this position by hand or by the hinged door when closed, and its cover is removed by engaging the tab or end 16 thereof, and drawing same away from the cartridge when the sensitized face of the first plate is ready for exposure.

When the hinged door 14 of the plate-holder is closed and secured, its spring 15 passes through the slot or opening 5 in the back of the cartridge and presses the plates 1 forward into position.

The plate-holder is provided at its outlet end with a slot 16ª through which each plate after exposure is pushed by the slide 13, and said slot is normally closed to prevent the intrusion of any actinic rays, by means of a spring shutter 17 or the like.

After the slide has been drawn out and the shutter of the camera operated and the plate exposed in the ordinary manner, the hinged portion 10 of the holder is temporarily swung round into line with the other portion, or if detachable is affixed in a similar position so that the exposed plate may be discharged and transferred thereto.

In order to insure a light proof joint between the two parts of the plate-holder, the one part has an overlapping ledge 18 and a transverse vertical tongue 19, the latter being adapted to fit into a corresponding groove 20 formed in the end of the other part 9. In addition to this the one part has two horizontal tenons 21, 21, adapted to fit into corresponding mortises 22, 22, in the other part. By this arrangement the light is excluded from the top and bottom and sides of the joint.

The hinged or detachable portion 10 of the plate-holder is provided with a hinged door 23, and at its end approximate to the other part with springs 24, 24, which hold the plate stationary against the back of the holder and out of the line of travel of the next plate as it is pushed therein so preventing the jagging of the ends of said plates on one another. Furthermore it is provided with an internal sleeve 25 and also with an end slot 26 for the passage of the plate, which slot is normally closed by a spring shutter 27 or the like.

The envelop 8 in which the cartridge 4 was packed is placed in the hinged or detachable part 10 with its open end around the sleeve as shown in Figs. 1 and 6 and the door is then closed.

The cartridge 4 at its forward side has an unobstructed opening through which the plates are normally pressed by the spring 15, the exposure controlling slide 13 normally covering the foremost plate. When the slide 13 is withdrawn to effect an exposure, the foremost plate will move forward under the action of said spring and will rest substantially in the plane of the slide 13, the innermost edge of the slide engaging the adjacent edge of the plate.

In order to transfer the exposed plate into the envelop the slide is pushed forward and the end of the plate opens the shutters 17 and 27 and passes through the slots 16ª and 26 and is dropped into the envelop 8 into the position shown in Fig. 1 where it is held by the spring 24 and when hinged the part 10 is conveniently swung back into the position shown by dotted lines 28 in said figure where it is locked, or if detachable it is simply disengaged from the other part. The next plate is then ready for exposure and so on until the cartridge is exhausted.

When it is desired to remove the exposed plates from the part 10 of the plate holder they are shaken down to the closed end of the envelop, and the latter is drawn slightly out of the hinged part as indicated by dotted lines 29 in Fig. 1, and then turned back as shown in Fig. 11. By this means the open end of the envelop is closed and held in that position by the hand or the like and on being removed from the plate-holder is finally sealed by sticking the gummed edge 30 to the side of the envelop as shown in Fig. 12. The exposed plates are thus safely removed from the holder without fear of fogging same. The slide 13 of the plate-holder has raised strips 31 near its side edges to prevent the scratching of the plates, and is furthermore provided with longitudinal grooves 32 engaging studs 33 on the plate-holder which limit its movements.

Having now particularly described and ascertained the nature of my said invention and in what manner the same is to be performed, I declare that what I claim is;—

1. In photographic apparatus of the class described, a plate holder having separate compartments therein, means for positioning the sensitized material in exposing position in one of said compartments, and means for positioning an opaque envelop in the other compartment to receive the sensitized material after it has been exposed in the compartment first mentioned.

2. In photographic apparatus of the class described, a cartridge adapted to receive a plurality of sensitized plates, one side of the cartridge having an unobstructed opening for the passage of the plates, and the upper edges of the cartridge having longitudinal grooves, a flexible and detachable cover adapted to close the opening in the cartridge and guided to slide in said grooves and an opaque wrapper enveloping the cartridge and adapted to be removed therefrom and serve as a receptacle for the exposed plates.

3. Photographic apparatus of the class described comprising a holder provided with separate compartments adapted to contain plates prior and subsequent to exposure, a light-tight removable cartridge having an opening for positioning the plates in exposing position in one of said compartments, an exposure controlling slide arranged to cover and uncover the sensitized plates, means for consecutively feeding the plates from the cartridge into alinement with said slide after the latter has been moved to exposing position, and means for conducting the exposed plates successively from said cartridge into the second compartment of the holder when the slide is returned to non-exposing position.

4. In photographic apparatus of the class described, a holder provided with a compartment adapted to be positioned in a camera field, an exposure controlling slide for opening and closing the front of said compartment, and a cartridge for the sensitized material adapted to fit into said compartment and provided with a flexible detachable cover which normally closes the front of said cartridge, said flexible cover being provided with a tab on its end which extends to the exterior of said compartment and provides means for removing the cover, an opaque envelop adapted to removably fit said cartridge, and means for positioning said envelop to receive the exposed sensitized material from the cartridge.

5. In photographic apparatus of the class described, the combination with a holder adapted to be positioned on a camera and provided with a compartment for the sensitized material, a slide on the holder for opening and closing the forward side of said compartment, and a door pivoted on the holder and serving to close the rear side of said compartment, of a cartridge adapted to fit into said compartment and provided with a slot in the rear thereof, a plurality of sensitized plates contained in the cartridge, each having an opaque backing with projecting strips or ribs on their longitudinal edges, a spring on the door arranged to project through the slot in the cartridge and bear against the plates therein, and a flexible cover normally closing the front of the cartridge and provided with a tab extending to the exterior of the holder, the flexible cover being slidable longitudinally of the cartridge, and an exposing slide on the holder arranged to successively remove the exposed plates from the cartridge.

6. A photographic apparatus of the class described comprising a cartridge adapted to contain a plurality of sensitized plates, the cartridge having an exposure opening and a passage at one edge through which the plates may pass successively after exposure, an opaque envelop shaped wrapper adapted to receive the plates from the cartridge after exposure, means for positioning said envelop to receive the plates discharging from the cartridge through the passage therein, and means for successively discharging the plates from the cartridge into said wrapper.

7. In means for the daylight loading and unloading of photographic sensitized plates, a plate-holder formed in two parts adapted to be connected together corresponding slots in the adjacent ends of said parts, spring shutters for normally closing said slots, a hinged door on one of said parts, a sleeve at one end thereof provided with springs, and an opaque open ended envelop-shaped wrapper adapted to fit around said sleeve substantially as and for the purposes set forth.

8. In means for the daylight loading and unloading of photographic sensitized plates, a plate-holder formed in two parts adapted to be connected and arranged endwise to each other, and means for insuring a light-proof joint between said parts comprising an over-lapping ledge on one of said parts and a vertical tongue in the end thereof corresponding with a groove in the other part and a pair of horizontal tenons on the one part corresponding with mortises in the other part substantially as and for the purposes set forth.

9. In means for the daylight loading and unloading of photographic sensitized plates, a plate-holder formed in two parts, one adapted to be attached to the camera and the other adapted to be hinged to said first mentioned part, and arranged to swing in line therewith, means to maintain a light-proof joint between said parts, an opaque envelop shaped wrapper positioned within the hinged part to receive the exposed plates, and means for transferring the exposed plates from the attached part into an opaque envelop-shaped wrapper contained in the hinged part substantially as and for the purposes set forth.

In testimony whereof I have hereunto set my hand in presence of two subscribing witnesses.

RUPERT RICHARD ALLEN.

Witnesses:
 EDWARD WATERS,
 EDWARD NEEDHAM WATERS.